United States Patent [19]

Hormansdorfer

[11] Patent Number: 4,950,002
[45] Date of Patent: Aug. 21, 1990

[54] SCREW SEAL

[76] Inventor: Gerd Hormansdorfer, Kastanieneck 6a, 3167 Burgdorf, Fed. Rep. of Germany

[21] Appl. No.: 202,389

[22] Filed: Jun. 6, 1988

[51] Int. Cl.$^5$ .......................... F16J 15/08; F16L 17/08
[52] U.S. Cl. .................................... 285/328; 277/236; 285/363; 285/917
[58] Field of Search ...................... 277/236, 217, 167.5; 285/212, 220, 917, 339, 369, 383, 13, 340, 341, 342, 344, 363, 328; 411/542, 544, 545, 531, 313, 314; 220/304; 138/89

[56] References Cited

U.S. PATENT DOCUMENTS

| 404,284 | 5/1889 | Johnson | 411/544 X |
|---|---|---|---|
| 1,437,646 | 12/1922 | Girard | 411/542 X |
| 1,799,834 | 4/1931 | Waterman | 277/167.5 X |
| 1,957,605 | 5/1934 | Lamont | 277/236 X |
| 2,356,901 | 8/1944 | Wackman | 220/304 X |
| 2,766,085 | 10/1956 | Muller | 277/217 |
| 2,795,444 | 6/1957 | Nenzell | 411/542 X |
| 2,992,840 | 7/1961 | Reynolds et al. | 285/340 X |
| 3,167,320 | 1/1965 | Kyle | 277/236 X |
| 3,208,758 | 9/1965 | Carlson et al. | 277/167.5 |
| 3,700,266 | 10/1972 | Glehn | 285/344 X |

FOREIGN PATENT DOCUMENTS

| 697347 | 1/1931 | France | 285/328 |
|---|---|---|---|
| 6805184 | 10/1968 | Netherlands | 285/917 |
| 762506 | 11/1956 | United Kingdom | 277/217 |
| 942447 | 11/1963 | United Kingdom | 285/917 |

Primary Examiner—Allan N. Shoap
Attorney, Agent, or Firm—Allegretti & Witcoff, Ltd.

[57] ABSTRACT

The invention concerns a sealing connection, based on a flat gasket of rectangular cross section, for the static sealing of construction elements. The shapes of the sealing surfaces according to the invention lead to a disc-spring-like bending of the gasket, superposed by a compressing deformation, by which an outstanding tightness even at lowest pressing forces is guaranteed. With that the application spectrum reaches from ultra high vacuum to high pressure, and from cryogenic to high temperatures.

2 Claims, 6 Drawing Sheets

SCREW SEAL

BACKGROUND OF THE INVENTION

This invention relates to a sealing connection for the static sealing of cylindrical members, such as a screw seal or flange seal used in high pressure or high vacuum engineering.

PRIOR ART

Many such sealing connections are known, the sealing function of which is based upon the compression of a ductile or elastic gasket between the elements to be sealed. The gasket may be made of rubber, fiber, plastic or soft metal.

The prior art sealing connections may be divided into three groups: (1) flat gaskets are pressed between flat surfaces; (2) flat gaskets are pressed between profiled surfaces; and (3) profiled gaskets (wire or coined rings, comb gaskets) are compressed between flat surfaces.

The first group includes screw seals with pipe plugs in accordance with German engineering standards DIN 908, DIN 910; gaskets in accordance with DIN 7603 and appropriate flange bores in accordance with DIN 3852. Although these screw seals are commonly used, their ability to seal is poor and high torques are required to obtain a seal. These seals do to reliably meet the requirements for high vacuum or high pressure applications.

The sealing connections of the second group require expensive machining to produce the profiled surfaces although the flat gaskets are relatively cheap. If the geometry of the profiled sealing surfaces is simplified, as in the case of the so-called step seal, the sealing ability is correspondingly reduced. On the other hand, there are a number of proven sealing connections in this group used as flange seals in high vacuum techniques, e.g. the Conflat and the Cajon double knife edge seal. However, these sealing connections can be produced in diameters below 30 mm only with great difficulty using extremely small, specially ground cutting tools. Consequently, they are available only in large diameters. Under varying temperature conditions at high vacuum the Conflat seal has a tendency to micro leakage.

Another sealing connection in the second group is a very thin flat gasket deformed like a disk spring between two complementary conical fitting flanges. See *Feinwerktechnik*, vol. 68 No. 4, page 136, FIG. 17, 1964. High pressing forces are required to deform the gasket and the resulting stress leads to micro cracks within the gasket so that helium tightness is not guaranteed.

Sealing connections in the third group are disadvantageous because it is difficult accurately to machine soft gasket material in the small geometrical profiles required. Just as costly is the fabrication from continuous lengths of material, such as round wire, which must be cut to length and welded or soldered. Fabrication by punching is not feasible. Furthermore, such gaskets can be used only one time.

OBJECT OF THE INVENTION

The object of the invention is to obviate the problems with the prior art and provide a sealing connection which is effective for high vacuum and pressure uses at varying temperatures. Another object is to provide a sealing connection having simple geometrical configurations which can be produced at low cost even in small dimensions and which connection uses throw-away gaskets of carbide metal capable of at least double reuse.

SUMMARY OF THE INVENTION

The seal connection of the invention uses a flat gasket which cooperates with complementary sealing surfaces of special shape. Each of the sealing surfaces has a sealing edge or rim, the flanks of which form an obtuse angle of between 100° and 150°. The first sealing surface comprises a cylindrical recess having an outer vertical cylindrical wall, an inner frusto-conical wall and a plane horizontal surface joining the cylindrical and frusto-conical walls. This shape is simple and easy to fabricate. However, the sealing rim would not be effective if the flat gasket is simply pressed against a plane sealing surface. An effective seal is achieved by deforming the flat gasket like a disk spring by axial compression during the grooving in of the sealing rim by means of a second sealing surface of special shape. This special shape, comprising a V-shaped rim (in cross section), in cooperation with the first sealing surface causes the gasket to tilt toward the central axis of the cylindrical parts being joined as the sealing surfaces are axially forced together. The complementary sealing rims under the axial force compress the gasket to form grooves in both sides thereof. The gasket is dimensioned to fit within the recess of the first sealing surface. As the gasket tilts, it is additionally deformed when the lower edge of its outer circumference is forced into contact with the outer vertical cylindrical wall of the recess in the first sealing surface.

The outer frusto-conical face of the V-shaped second sealing surface joins an axially extending cylindrical surface having a diameter slightly smaller than the cylindrical recess in the first sealing surface to centralize the second sealing surface as the parts come together. Additionally, the disk spring like deformation of the gasket centers the sealing rim of the second sealing surface thus avoiding a detrimental eccentric grooving in. This function is achieved because the outer diameter of the gasket essentially corresponds to the inner diameter of the cylindrical recess and the outer frusto-conical wall of the V-shaped rim of the second sealing surface is inclined with respect to the horizontal surface of the recess at an angle of between 30° and 60°. Most importantly, the difference in the diameters of the cooperating sealing rims is a little larger but not more than the thickness of the gasket. Because of the simple geometry, the obtuse angles of the sealing surfaces, as well as the inclination of the sealing rim on the second sealing surface, the areas to be machined are easy to get at with normal cutting tools.

Both sealing rims terminate at their edges with a small radius thereby avoiding rupture of the gasket as the components are pressed together. This is especially important if one of the components is rotated during pressing.

The gasket used in the invention has a rectangular cross section and is made from a ductile material, e.g. rubber, fiber, plastic, metal. Soft annealed copper coated with a nickel or silver galvanic layer is especially suitable. For vacuum application, the gasket may be provided with one or more cut-out sections in its outer diameter to facilitate helium leakage tests. A triagonal deformation of the gasket performs this function without cutting. This embodiment has the further advantage that the gasket can be made by punching within larger tolerances and subsequently calibrated by pressing from these sides.

Good engineering practice requires that a new gasket be inserted after opening a sealing connection and this procedure is recommended in accordance with the invention. However, appropriate tests indicate that the gasket used in accordance with the invention can be reused up to ten times. Reuse is essential in special applications of vacuum engineering, e.g. if a receptacle has to be reexhausted by means of a pumping lock. It would be highly disadvantageous if in such case where the whole unit must be filled with air to have to change the gasket. By examining the depressions in the gasket and the corresponding contacting surfaces of the sealing surfaces of the two components being joined, it is possible to determine on which of the two components the gasket should be placed after opening the connection. Seals of this kind commonly consists of the combination of a pipe plug and drain hole It is recommended that the gasket be placed on the bolt of the pipe plug. This placement is further supported by the slight conical taper in the direction of the sealing surface in the appropriate zone of the bolt. After the first tightening of the sealing connection, the deformed gasket will be stuck on the bolt and thus an be reused without danger of losing it. The geometry of the invention permits easy disassembly of the reused gasket by inserting the pipe plug in a correspondingly bored block of wood and tapping the head of the plug with a mallet. The disk springlike deformation of the gasket is nullified in that way and the gasket is slightly widened and separated.

The sealing connection of the invention also permits jamming of the gasket on its outer circumference. Further, the gasket may be internally threaded which permits unscrewing the gasket from the plug.

DETAILED DESCRIPTION

Figure 1:
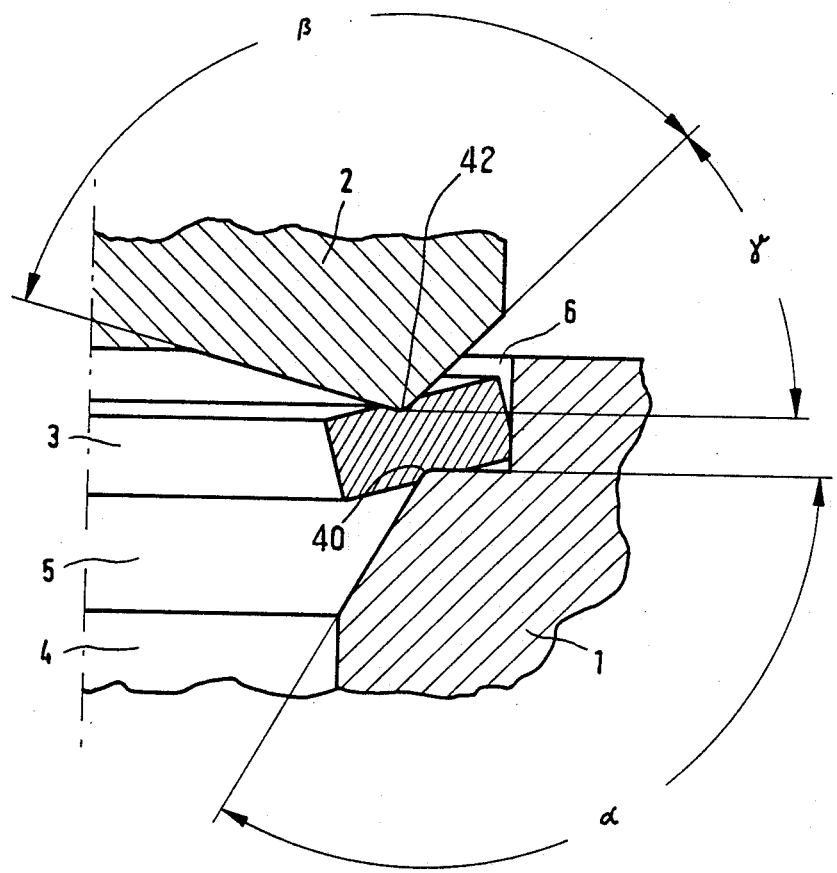
FIG. 1 is a sectional axial view through the sealing surfaces of the cylindrical members being joined, the sealing surfaces being broken away from their corresponding parts. The parts are shown in the tightened state.

Referring to FIG. 1 showing the seal in cross section, a first component 1 is to be joined in sealing relationship with a second component 2 using a gasket 3. Component 1 has a bore 4 which is closed by means of the seal. A cylindrical recess 6 is provided in the end of component 1 surrounding the bore 4. The recess has an outer vertical cylindrical wall and a horizontal plane surface joining that wall at a right angle. The horizontal plane surface merges with an inner frusto-conical wall 5 which leads into the bore 4. The angle defined by the frusto-conical surface 5 and the horizontal surface of the recess 6 is identified in the drawing as angle α and equals 120°. It may range from 100° to 150°. A sealing rim 40 is formed where the horizontal wall of the recess merges with the frusto-conical wall. The edge of the rim is slightly rounded. The radius will range between 0.1 and 1.0 mm.

The second component 2 constitutes a sealing lid having a sealing surface which is V-shaped in cross section. The circumferential surfaces forming the V are disposed at an angle β of 120° which may range between 100° and 150°. These surfaces joint to form a circular rim 42. The outer face of the V-shaped sealing surface forms an angle γ of between 30° and 60°, preferably 45°, with a horizontal line drawn through the sealing rim 42. The inner face of the V-shaped sealing surface forms an angle of 10° to 15° with a horizontal line drawn through the sealing rim. The difference in diameters between the sealing rim 42 on the lid 2 and the sealing rim 40 on the component 1 is smaller than, but does not exceed, the thickness of the gasket 3. The sealing rim 42 is also rounded to avoid rupturing the gasket. The outer diameter of the gasket 3, when initially assembled, essentially corresponds to the diameter of the cylindrical recess 6. When force is applied to the two cylindrical members being joined, the gasket is deformed like a disk spring because of the forces exerted on its by means of the complementary sealing rims. It will be noted that the lower portion of the circumference of the gasket is pressed against the vertical cylindrical wall of the recess 6. At the same time, the sealing rims of the two components form grooves in both sides of the gasket and effect a compressing deformation of the gasket.

Figure 2:
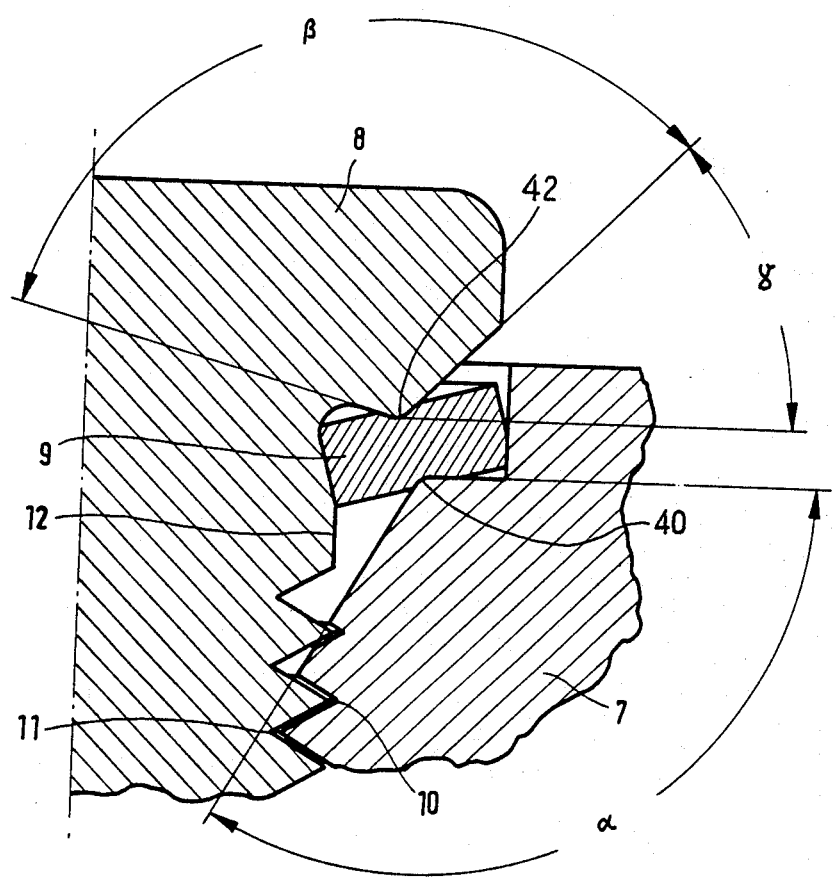
FIG. 2 is a view similar to FIG. 1 showing another embodiment of the invention in which a plug and cooperating threaded flange are screwed together.

Referring to FIG. 2, a flange 7 containing an opening surrounded by a cylindrical recess is closed by means of a pipe plug 8 and a gasket 9 be screwing the threaded plug into the treads 10 of the flange 7. The hexagonal socket disposed in the top of the pipe plug has been omitted to simplify the drawing. The angles α, β, and γ in FIG. 2 correspond in size to those of FIG. 1. The essentially cylindrical mantel surface 12 on the bolt portion of the pipe plug 8 between the ends of the threads and the sealing surface is slightly tapered in the direction of the sealing surface to effect a jamming of the gasket after the first tightening of the pipe plug. The gasket is compressed between offset rims 40 and 42.

Figure 3:
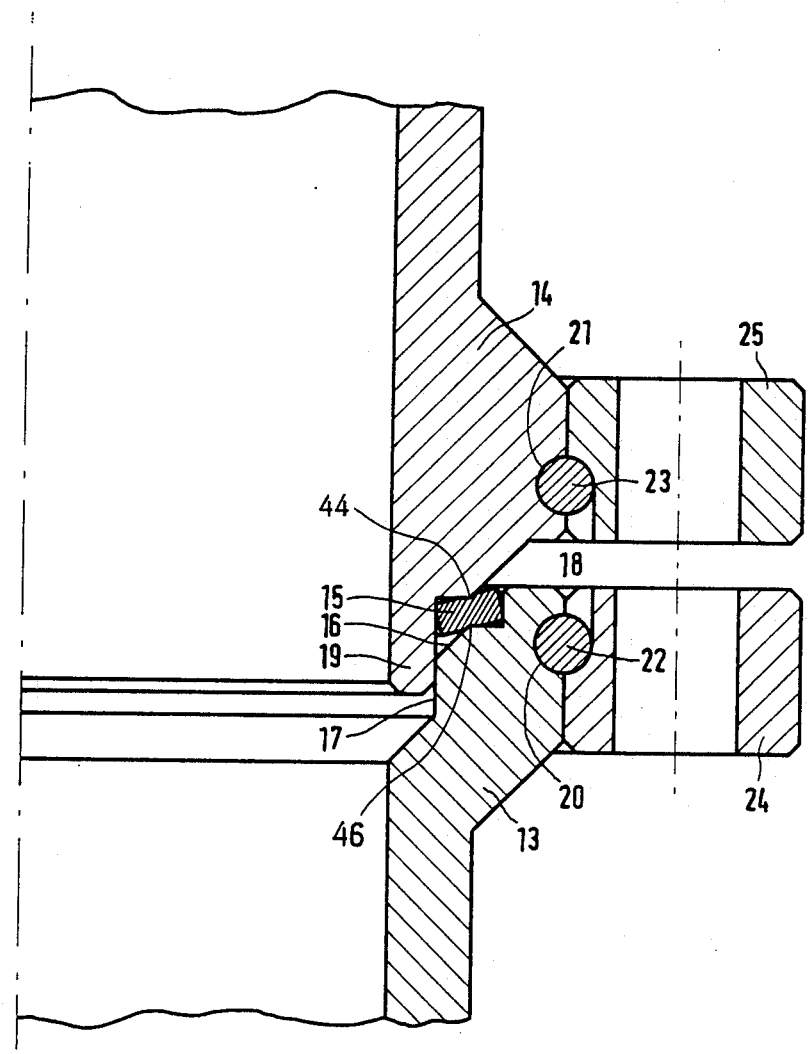
FIG. 3 is a view similar to FIG. 1 illustrating a sealing connection for joining flanged pipes using the seal of the invention.

FIG. 3 shows an embodiment of the invention for flanged pipes of medium sized diameter. The lower flange 13 has a cylindrical recess which merges with the frusto-conical section 16 to form the sealing rim 46 as in FIG. 1. The lower flange is cylindrically enlarged at 17 to receive and center the upper flange 14. The upper flange 14 has a sealing surface, the sealing rim 44 of which is formed by the outer frusto-conical surface 18 which joins the horizontal slip flange 25. Rim 44 is of smaller diameter than rim 46. Flange 14 has an axially-extending lip or mouth 19 which fits into the enlarged opening 17 to center the lower and upper flanges. Both flanges have an outer circular groove 20, 21 with a circular clip 22, 23 which serve as a support for the slip flanges 24, 25 which are used to draw the pipes together.

Figure 4:
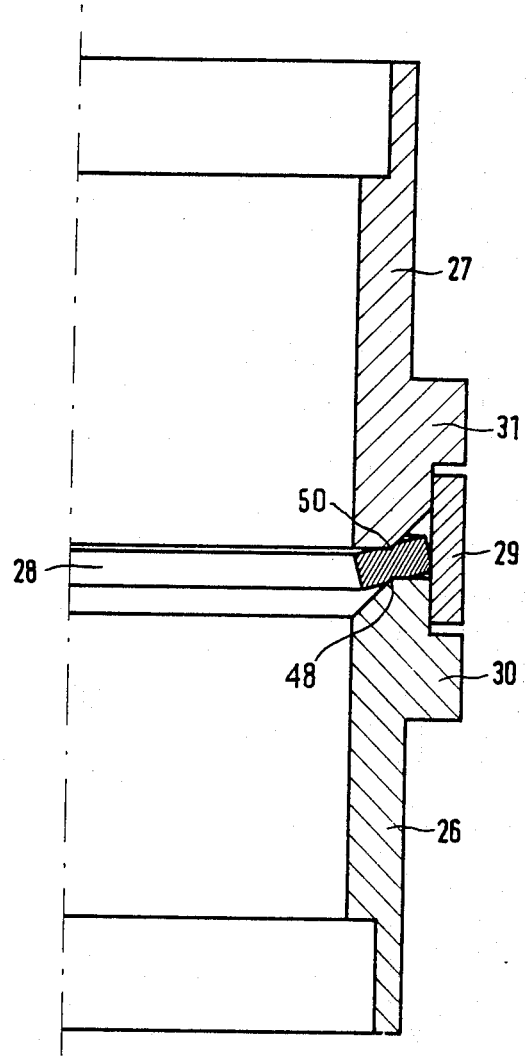
FIG. 4 is a view similar to FIG. 1 which illustrates joining smaller tubes using the seal of the invention.

FIG. 4 sows a seal for smaller diameter tubes comprising a lower gland 26 and an upper gland 27. The glands 26, 27 take the form of fittings soldered to the ends of tubes, not sown, to be joined. The sealing rim 48 at the sealing surface of the lower fitting is formed by a plane horizontal surface which adjoins an inner frusto-conical surface. An outer counteracting surface against the circumference of gasket 27 is provided by a separate sleeve 29 which slides over the outside of the fittings 26, 27 between the collars 30, 31. The removable sleeve makes the sealing surface easy to get at if polishing is necessary. The sleeve is sufficiently wide to center the two fittings. The seal is generally of the same construction as the one shown in FIG. 1, except that the seal rim 50 on the bottom of the upper fitting is formed by a horizontal face joining the frusto-conical face. The collars 30, 31 support fasteners for pulling the two fittings together.

In FIGS. 5-8 embodiments of gaskets suitable for use in the invention are shown.

Figure 5:
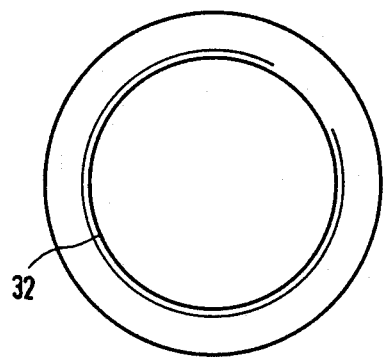
FIGS. 5, 6, 7 and 8 are plan view of various gasket configurations which can be used in accordance with the invention.

FIG. 5 shows a gasket with an inner thread 32 which allows the gasket to be turned onto a threaded mating part.

Figure 6:
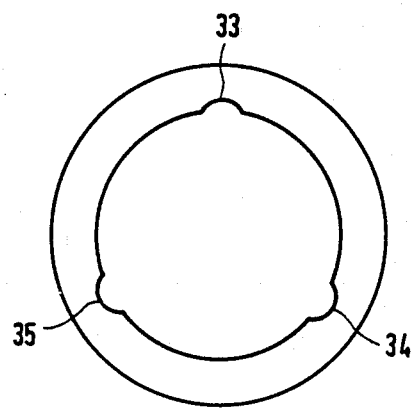
Figure 7:
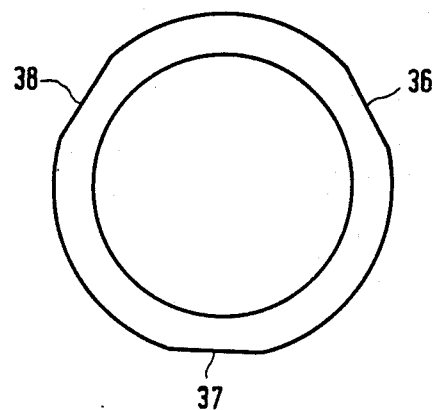

The gasket of FIG. 6 has three grooves or scallops 33, 34, 35 cut in the inner circumference. These are used in carrying out helium leakage tests. Flattened sections 36, 37, 38 on the exterior circumference of the gasket shown in FIG. 7 serve the same purpose.

Figure 8:
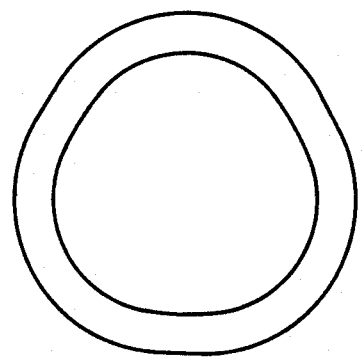

FIG. 8 shows an embodiment having a triagonal deformed shape which can be prepared simply by radially compressing a round gasket. A gasket like this can be easily calibrated on the inner and outer diameter.

The sealing connection prepared in accordance with the invention is characterized by outstanding tightness which is guaranteed at very low pressing forces. The seal can be used in applications ranging from ultrahigh vacuum to high pressure. By using appropriate materials, very high thermal resistance can be achieved. The invention is operable with either conventional flat gaskets or slightly modified gaskets. The geometries of the sealing surfaces lend themselves to uncomplicated and inexpensive manufacture using standard throwaway cutting inserts. Thus, the invention provides a sealing system which offers a technical improvement and at the same time, a reduction in manufacturing costs.

I claim:

1. Sealing connection between two coaxial cylindrical members having cooperating sealing surfaces comprising
    a first sealing surface having an outer vertical cylindrical wall,
    an inner frusto-conical wall, and a horizontal surface joining said cylindrical wall and merging with said frusto-conical wall to provide a first sealing rim,
    a second sealing surface opposed to said first sealing surface, said second sealing surface having in cross section a V-shaped second sealing rim, the diameter of said V-shaped second sealing rim being smaller than the diameter of said first sealing rim,
    the outer face of said second sealing surface joining an axially-extending cylindrical surface having a diameter slightly less than the diameter of said outer vertical cylindrical wall, and
    an annular gasket of ductile material, flat in the undeformed state, having a substantially rectangular cross section disposed on said horizontal surface between said first and second sealing rims,
    the difference in diameters between said first and second sealing rims being less than the thickness of said gasket
whereby upon axially forcing the two coaxial cylindrical members together the gasket is tilted toward the axis of said members and said sealing rims bite into the surface of said gasket.

2. Sealing connection between two coaxial cylindrical members having cooperating sealing surfaces comprising
    a first sealing surface having an outer vertical cylindrical wall, formed by a sleeve encircling both said co-axial cylindrical members,
    an inner frusto-conical wall, and a horizontal surface joining said cylindrical wall and merging with said frusto-conical wall to provide a first sealing rim,
    a second sealing surface opposed to said first sealing surface, said second sealing surface having in cross section a V-shaped second sealing rim, the diameter of said V-shaped second sealing rim being smaller than the diameter of said first sealing rim, and
    an annular gasket of ductile material, flat in the undeformed state, having a substantially rectangular cross section disposed on said horizontal surface between said first an second sealing rims,
    the difference in diameters between said first and second sealing rims being less than the thickness of said gasket
whereby upon axially forcing the two coaxial cylindrical members together the gasket is tilted toward the axis of said members and said sealing rims bite into the surface of said gasket.

* * * * *